US00RE33800E

United States Patent [19]

Fornwalt et al.

[11] E Patent Number: Re. 33,800

[45] Reissued Date of Patent: Jan. 21, 1992

[54] METHOD FOR ELECTROPLATING NICKEL ONTO TITANIUM ALLOYS

[75] Inventors: Donald E. Fornwalt, East Corinth, Vt.; Gary M. Lomasney, New Britain; Kostas Routsis, East Hartford, both of Conn.

[73] Assignee: United Technologies Corporation, Hartford, Conn.

[21] Appl. No.: 634,854

[22] Filed: Dec. 27, 1990

Related U.S. Patent Documents

Reissue of:

[64] Patent No.: 4,902,388
Issued: Feb. 20, 1990
Appl. No.: 375,231
Filed: Jul. 3, 1989

[51] Int. Cl.[5] ..... C25D 5/38

[52] U.S. Cl. ..... 205/212; 205/273

[58] Field of Search ..... 204/32.1

[56] References Cited

U.S. PATENT DOCUMENTS

| | | | |
|---|---|---|---|
| 2,829,091 | 4/1958 | Missel | 204/32.1 |
| 3,087,874 | 4/1963 | Greisl et al. | 204/32.1 X |
| 3,647,647 | 3/1972 | Winfree | 204/32.1 |
| 3,725,217 | 4/1973 | Hartshorn | 204/32.1 |
| 4,127,709 | 11/1978 | Ruben | 429/245 |
| 4,416,739 | 11/1983 | Turner | 204/32.1 |
| 4,588,480 | 5/1986 | Thoma | 204/37.1 |
| 4,655,884 | 4/1987 | Hills et al. | 204/32.1 |
| 4,787,962 | 11/1988 | Temprano et al. | 204/32.1 |
| 4,938,850 | 7/1990 | Rothschild et al. | 204/29 |

OTHER PUBLICATIONS

Larissa Domnikov, Metal Finishing, pp. 59-62, Mar. 1962.

*Primary Examiner*—John F. Niebling
*Assistant Examiner*—Steven P. Marquis
*Attorney, Agent, or Firm*—James M. Rashid

[57] ABSTRACT

This invention relates to an improved method for electroplating a layer of nickel into titanium base alloy substrates. It is particularly useful in electroplating a layer of nickel onto titanium alloys which contain refractory metal elements, such as the alloy Ti-8Al-1V-1Mo. The method includes the steps of etching the surface of the substrate with a solution containing hydrofluoric acid and hydrochloric acid, followed by electroplating the etched surface in a nickel sulfamate solution.

4 Claims, No Drawings

METHOD FOR ELECTROPLATING NICKEL ONTO TITANIUM ALLOYS

Matter enclosed in heavy brackets [ ] appears in the original patent but forms no part of this reissue specification; matter printed in italics indicates the additions made by reissue.

TECHNICAL FIELD

This invention relates to electroplating, and in particular, to a method for electroplating a layer of nickel onto titanium and titanium base alloys.

BACKGROUND

U.S. Pat. Nos. 4,127,209 to Ruben, 4,416,739 to Turner and 4,787,962 to Temprano all describe methods for electroplating a layer of nickel onto titanium and titanium base alloys. Turner indicates that it is difficult to achieve good adhesion between the titanium substrate and the layer of electroplated nickel because an oxide film is typically present on the surface of the substrate. Turner's invention is to use an aqueous solution of hydrofluoric acid and formamide to remove to oxide. Ruben removes the oxide by connecting the substrate as the cathode in an acid solution such as sulfuric acid, and then forming a layer of titanium hydride on the substrate. Temprano pickles the substrate surface with a 95% sulfuric acid solution. Other prior art methods for removing the oxide scale include a solution containing hydrofluoric acid and nitric acid.

While the aforementioned methods may be successful with some titanium alloys, they are not useful on some specialty titanium alloys of the type used in the gas turbine industry. Accordingly, workers in this field seek improved techniques for applying electroplated layers of nickel onto state-of-the-art titanium alloys. This invention satisfies such a need.

SUMMARY OF THE INVENTION

According to this invention, components having a titanium base alloy composition are nickel plated by the steps which include etching the surface of the component in a hydrofluoric acid-hydrochloric acid solution followed by electroplating in a nickel sulfamate bath. The solution should have a composition corresponding to that obtained by mixing, by volume, 4–6% of 70% HF, balance 35–38% HCl. Specimens which have been etched in such a solution and then are electroplated in a nickel sulfamate bath have excellent bond strength.

Other features and aspects of this invention will be apparent in light of the following description of the best mode for carrying out the invention.

BEST MODE FOR CARRYING OUT THE INVENTION

This invention relates to a process for electroplating a layer of nickel onto titanium and titanium base alloys. It should be understood that the term "titanium base" means those alloys in which titanium is the predominant element in the alloy composition.

This invention has shown to be particularly applicable to the electrodeposition of nickel onto titanium base alloys which include refractory metal elements. Such alloys include, but are not limited to, the following compositions: Ti-3Al-2.5V; Ti-6Al-4V; Ti-8Al-1V-1Mo; Ti-6Al-2Sn-4Zr-6Mo; and Ti-6Al-2Sn-4Zr-2Mo.

The key aspect of the invention is the use of a particular chemical solution for cleaning the surface of the titanium substrate prior to the electrodeposition step. The chemical solution etches the substrate surface, and, as a result, the step is referred to as an etching step. The preferred manner for carrying out this invention is described below.

Portions of the component (an alloy whose composition was Ti-8Al-1V-1Mo) which are not to be etched or electroplated are masked with an appropriate masking material; wax and polymer based resins are preferred. Dirt, oil and other residue which are present on the surface are removed by a dry pumice swab followed by a wet pumice swab. The surface is vapor blasted with aluminum oxide grit and then rinsed, preferably in water. The substrate is then immersed in a solution whose composition corresponds to that obtained by mixing, by volume, 4–6% of 70% hydrofluoric acid and 94–96% of 35–38% hydrochloric acid. The substrate is immersed in such solution for a period of time sufficient to clean and etch the surface but not so long as to excessively etch or pit the surface. Periods of time between about 8 and 45 seconds are useful; 10 to 20 seconds are preferred, and about 15 seconds is the most preferred immersion time. The substrate is removed from the HF-HCl bath and rinsed in water. To insure that no residual acid and/or smut is present on the substrate, it is ultrasonically cleaned for about 10 seconds in deionized water.

The substrate may be etched in a solution containing hydrofluoric acid, glacial acetic acid and water. The preferred solution contains, by volume, 11–15% of 70% hydrofluoric acid, 81–85% glacial acetic acid, and 2–6% water. The etching is done anodically, at a current of about [1.4] *161* amperes per square meter (ASM) for about 6 minutes. The substrate is then rinsed and then cathodically plated in a conventional nickel sulfgmate solution. The plating process takes place for about 30 minutes at [2.7] *323* ASM. The substrate is then preferably heat treated at about 400° C. for 4 hours in air.

Use of the aforementioned plating process produces an electrodeposited layer of nickel having a thickness of about 12–18 microns. The bond strength of the layer after heat treatment is in excess of 475 kilograms per square centimeter, as determined by lap shear specimens.

The use of conventional prior art cleaning techniques produced nickel layers which were generally nonadherent to a Ti-8Al-1V-1Mo substrate. In particular, etching solutions containing, by volume, about 12% of 70% hydrofluoric acid and 1% of 70% nitric acid were not useful, as they produced a tenacious smut which could not readily be removed from the substrate surface. The HF-$HNO_3$ solution is commonly used with much success on titanium alloys which are substantially free of refractory elements.

While this invention has been shown and described with respect to a preferred embodiment, it should be understood by those skilled in the art that various changes in the form and detail may be made without departing from the spirit and scope of the invention. For example, other concentrations of hydrofluoric acid and hydrochloric acid may be used other than the aforementioned 70% HF and 36–38% HCl. Regardless of the particular concentrations used, the solution should have a composition corresponding to that obtained by mixing 4–6% of the 70% HF and 94–96% of the 36–38% HCl.

The fluoride ion content of such solutions are readily measured using a conventional fluoride ion specific electrode.

We claim:

1. A method for electroplating a layer of nickel onto a titanium base alloy containing refractory metal element, comprising the steps of etching the component surface in a solution having a composition corresponding to, by volume, about 4–6% of 70% HF and 94–96% of 36–38% HCl, and then cathodically plating a layer of nickel onto the etched surface.

2. A method for electroplating a layer of nickel onto the surface of a titanium base alloy component containing at least 1% by weight of a refractory metal element, comprising the steps of:

(a) etching the component surface in a room temperature solution containing, by volume, about 94–96% of 36–38% HCl and about 4–6% of 70% HF for at least about 10 seconds;

(b) anodically etching the component in a room temperature solution containing, by volume, about 11–15% of 70% HF, 81–85% glacial acetic acid and 2–6% $H_2O$; and (c) cathodically plating a layer of nickel onto the surface.

3. A method for applying a layer of nickel onto a titanium base alloy component containing at least 1 weight % of a refractory metal element, comprising the steps of:

(a) etching the surface of the component in a room temperature solution consisting essentially of, by volume, about 94–96% of 36–38% HCl and about 4–6% of 70% HF for at least about 10 seconds;

(b) anodically etching the component surface at about [1.4] *161* amperes per square meter for about 6 minutes in a room temperature solution consisting essentially of, by volume, about 11–15% of 70% HF, 81–85% glacial acetic acid and 2–6% $H_2O$; and (c) cathodically plating a layer of nickel onto the etched component surface at [2.7] *323* amperes per square meter for about 30 minutes in a nickel sulfamate solution.

4. The method of claim 3, wherein said etching step is conducted is a solution containing 95% of 36–38% HCl and 5% of 70% HF.

* * * * *